United States Patent
Hamert et al.

(10) Patent No.: US 6,460,614 B1
(45) Date of Patent: Oct. 8, 2002

(54) SUBSTANTIALLY FLAT ENAMELLED METAL HEAT EXCHANGER

(75) Inventors: Jean-Marie Hamert, Hoenheim (FR); Antonio Castiglioni, Milan (IT)

(73) Assignees: DE Dietrich Process Systems, Zinswiller (FR); Icoss S.r.l., Liscate-Milano (IT)

( * ) Notice: Subject to any disclaimer, the term of this patent is extended or adjusted under 35 U.S.C. 154(b) by 0 days.

(21) Appl. No.: 09/555,664

(22) PCT Filed: Nov. 27, 1998

(86) PCT No.: PCT/FR98/02550

§ 371 (c)(1),
(2), (4) Date: Jul. 7, 2000

(87) PCT Pub. No.: WO99/28691

PCT Pub. Date: Jun. 10, 1999

(30) Foreign Application Priority Data

Dec. 2, 1997 (FR) .............................................. 97 15355

(51) Int. Cl.⁷ ................................................. F28D 9/00
(52) U.S. Cl. ......................... 165/170; 165/133; 165/906
(58) Field of Search ................................. 165/133, 165, 165/166, 170, 906

(56) References Cited

U.S. PATENT DOCUMENTS

| | | | | | |
|---|---|---|---|---|---|
| 1,958,899 A | * | 5/1934 | MacAdams | .................. | 165/170 |
| 2,877,000 A | * | 3/1959 | Person | ...................... | 165/166 |
| 4,203,421 A | * | 5/1980 | Bencic | ........................ | 126/144 |
| 4,235,281 A | * | 11/1980 | Fitch et al. | .................. | 165/115 |
| 4,649,894 A | * | 3/1987 | Hoeffken | ...................... | 126/119 |
| 5,174,928 A | * | 12/1992 | Cheng et al. | ................ | 261/128 |
| 5,465,785 A | * | 11/1995 | Adderley et al. | ........... | 165/166 |

FOREIGN PATENT DOCUMENTS

| | | | | |
|---|---|---|---|---|
| DE | 342254 A1 | * | 6/1922 | .................. 165/170 |
| EP | 0203288 | | 12/1986 | |
| EP | 0522360 | | 1/1993 | |
| EP | 0566208 | | 10/1993 | |
| FR | 582.898 B1 | * | 12/1924 | .................. 165/170 |
| FR | 1.324.655 B1 | * | 3/1963 | .................. 165/170 |
| FR | 2173424 | | 10/1973 | |
| FR | 2392349 | | 12/1978 | |
| SE | 80197 B1 | * | 4/1934 | .................. 165/170 |
| WO | 79/00068 | | 2/1979 | |
| WO | 91/11252 | | 8/1991 | |

* cited by examiner

Primary Examiner—Allen Flanigan
(74) Attorney, Agent, or Firm—Davis & Bujold, P.L.L.C.

(57) ABSTRACT

The heat exchanger according to the invention consists of two flat or slightly incurved parallel surfaces formed in two sheets of metal (2) and (3). The longitudinal edge pieces (8) and (9) and transverse edge pieces (12) and (13) have rounded edges. The entire exterior surface is coated with enamel. These exchangers may be used in groups of several parallel units arranged inside a tubular body, or they may be disposed in a radiating pattern inside a cylindrical tank in a chemical reactor, forming a complex exchanger. This invention is of interest to manufacturers of industrial heat exchangers, particularly exchangers designed for the chemcial, pharmaceutical or agricultural/food industries.

19 Claims, 10 Drawing Sheets

SUBSTANTIALLY FLAT ENAMELLED METAL HEAT EXCHANGER

The invention concerns a flat, enameled, pouch-shaped heat exchanger that is useful for many purposes, especially processes involving strong chemicals such as those used in the chemical and pharmaceutical industries.

BACKGROUND OF THE INVENTION

Plate-type, enameled heat exchangers consist of a series of superimposed plates each defining a flat space, through which streams of two liquids of different temperatures flow alternately from one space to the next.

Heat exchangers such as this are described in Patent No. EP No. 0566208 filed by ABB LUMMUS HEAT TRANSFER BV and No. EP 0522360 filed by ROTHEMUHLE BRANDT KRITZLER.

The first invention consists of a block comprising a stack of enameled plates separated from one another by cross pieces, which may be formed in the elements that constitute a set of braces. The plates are enameled first and then joined at the edges or sealed along the perimeters.

The second invention consists of a stack of metal plates or sheets that are alternately flat and undulating. The wavy shape of the undulating metal pieces defines flat, adjacent channels between two successive pieces of metal providing passageways for fluids of different temperatures.

These exchangers are designed primarily for thermal exchange between two gaseous fluids. Their enamel coating provides increased corrosion resistance when potent condensing agents are used.

The condensing agents in these exchangers are neither massive in volume nor highly potent, and for this reason, the exchangers do not require the same degree of protection as those used in the chemical and pharmaceutical industries.

Heat exchangers currently used in the chemical and pharmaceutical industries and therefore subjected to strong chemicals typically consist of bundles of enameled tubes. Chemical exchangers of this type have been described in Patent Nos. FR 2392349 in the name of PFAUDLER and EP No. 0203288 in the name of TYCON Spa. The enameled tubes are either soldered or banded together onto terminal plates. They are also attached to these plates with a gasket seal. The tubes are either coated with enamel before attachment or coated together after attachment to the terminal plates. In the first instance, one seal is required for each tube, which increases the risk of leakage in proportion to the number of seals used.

In the second instance, coating the joined tubes afterwards is complicated by the large number of tubes that must be coated simultaneously.

Heat exchangers with flat elements to contain the fluid are particularly useful because they have a large heat exchange surface, but only one inlet and one outlet.

In addition, a thin, pouch-like shape provides very effective, rapid heat exchange.

Flat elements serving as heat exchangers are made primarily of metal, like a flat radiator. The metal pieces are bent to form a flat half-shell. Then two half-shells are joined at their peripheral edges, generally by electrical soldering, forming a thin longitudinal ridge.

A disadvantage shared by all these exchangers is that there are seams and assembly areas which also must be coated with enamel. For example, not only are there connections between the plate edges and the supporting structure, but there are also seals between the tube extremities and the flanges.

Coating these areas is problematic because of the raised portions and the mechanical properties of the surfaces. Moreover, flat exchangers have multiple connecting points on their lateral surfaces where two plates are joined. This uneven surface is not conducive to applying a regular coat of enamel. On the contrary, there is a considerable risk that a flawed, discontinuous surface will be produced, causing weak points in the enamel which will be quickly attacked in a corrosive environment, thus causing leaks. These difficulties require operators to take many precautions and to be constantly on the lookout for leaky areas.

In addition, larger dimension flat heat exchangers have multiple connection points on their lateral surfaces designed to ensure consistent spacing between the two pieces of metal and to make the entire unit mechanically rigid.

Enameling these areas requires considerable skill and care, and thus, if the exchangers are being mass produced, there is a high risk that the coating will be defective in this area. Only certain carefully selected workers possess the necessary skill and will take the care required, and thus, it is apparent that the enamel coating process increases product cost considerably.

SUMMARY OF THE INVENTION

The object of the present invention is to enamel-coat flat metal exchangers and render them resistant to chemical products, thereby opening up a vast field of industrial applications, especially in the fields of chemistry and pharmaceuticals.

BRIEF DESCRIPTION OF THE DRAWINGS

Other characteristics and features of the invention will be apparent from the following description, given by way of example, and accompanied by the drawings, in which:

FIGS. 1, 2, 3: perspectives of three variations of unitary enameled exchangers according to the invention, respectively:

a single compartment exchanger with an inlet/outlet connection at each of its extremities, a double, parallel compartment exchanger with a common outlet at each of its extremities, and a double, parallel compartment exchanger with distinct individual outlets on the same side;

DESCRIPTION OF THE PREFERRED EMBODIMENTS

Figure 1:
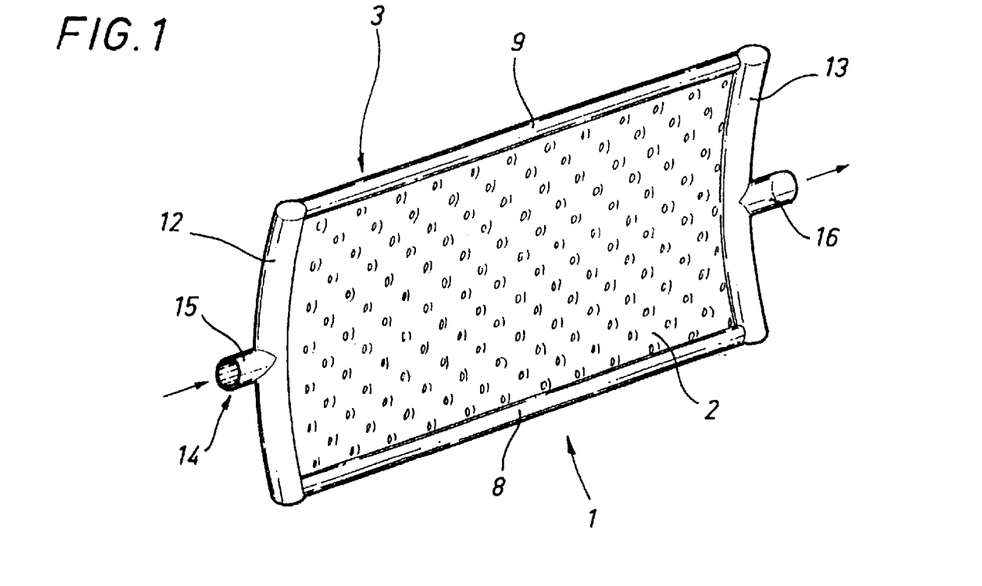
Figure 2:
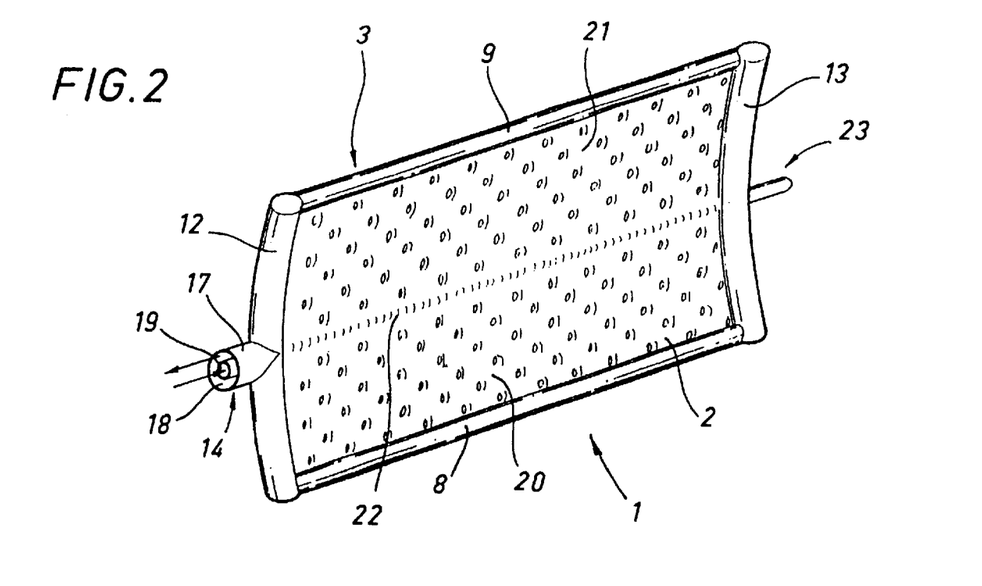
Figure 3:
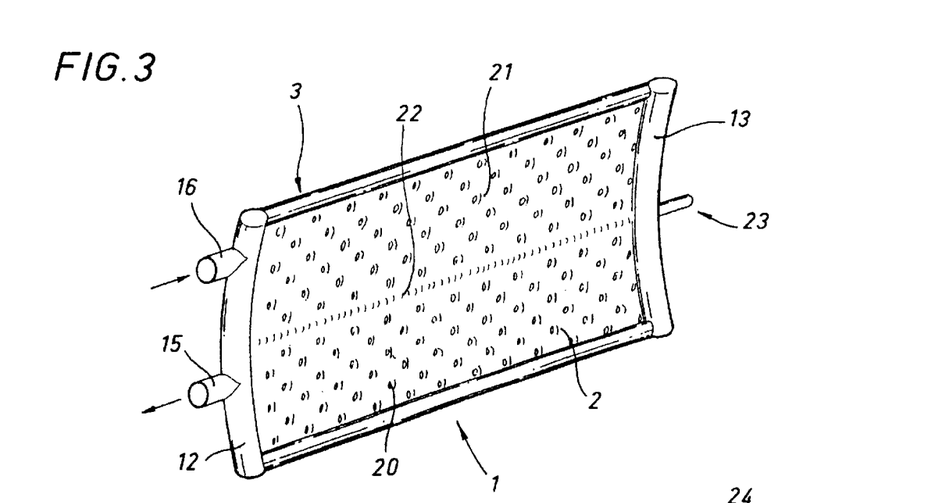
Figure 4:
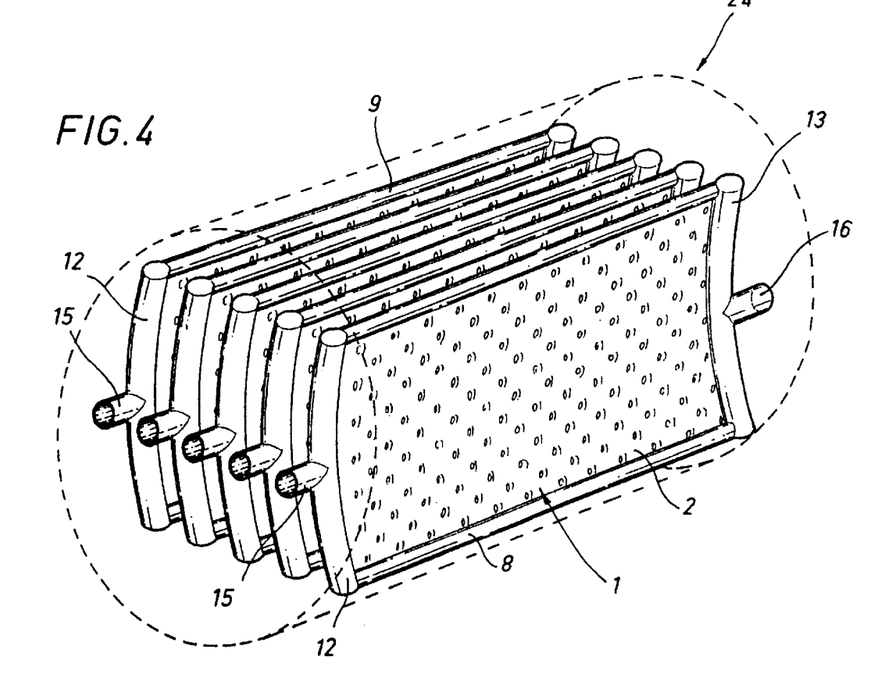
FIG. 4: a schematic perspective of a parallel grouping of several unitary exchangers incorporated in a tubular envelope forming a tubular exchanger with a broad exchange surface.
Figure 5:
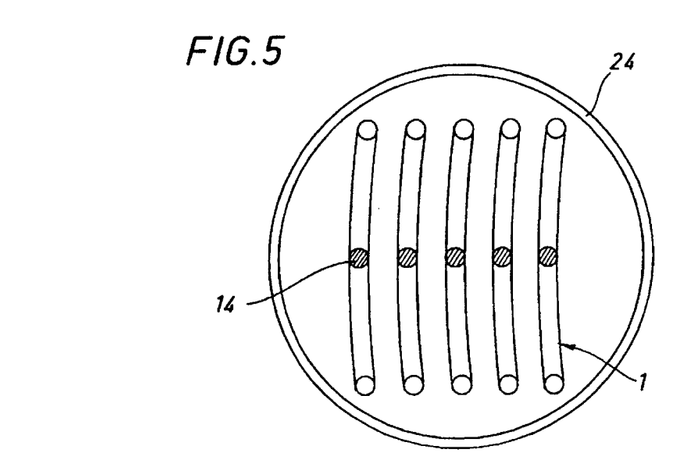
FIGS. 5 and 6: schematic transverse cross-sections of two possible dispositions of a tubular exchanger occupied by flat unitary exchangers in parallel arrangement, of identical size or increasing in size from the extremities to the center, respectively.
Figure 6:
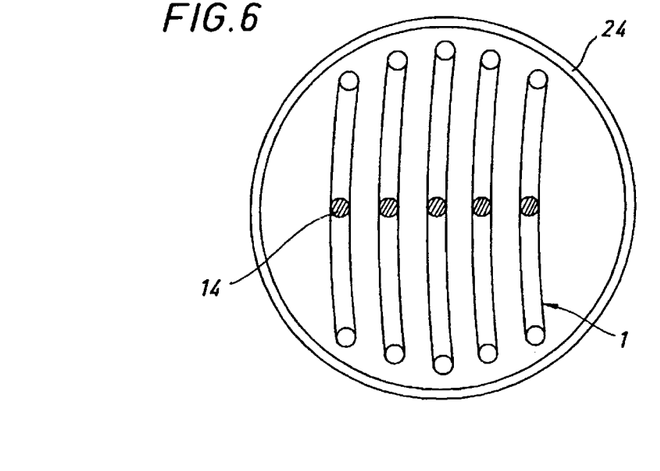
Figure 7:
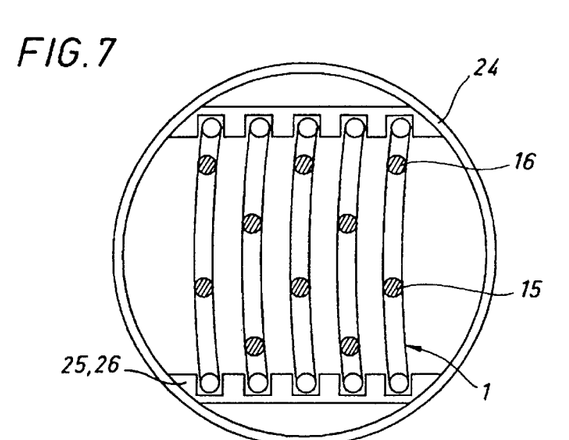
FIG. 7: a schematic transverse cross-section showing an example of a support for the body of elementary enameled exchangers.
Figure 8:
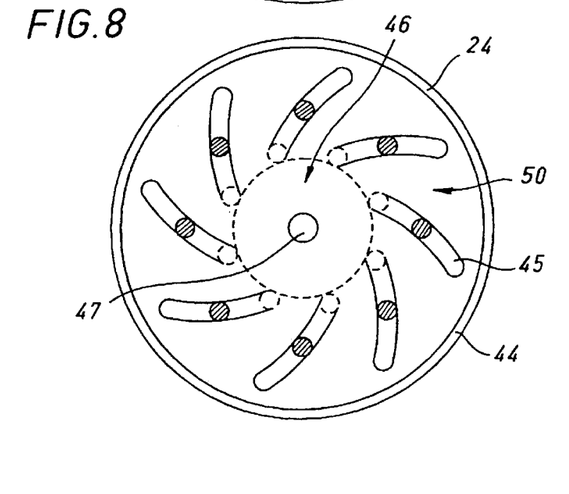
FIG. 8: a plan view showing a star-shaped arrangement inside a vertical cylindrical container, which could be used with a chemical reactor.
Figure 9:
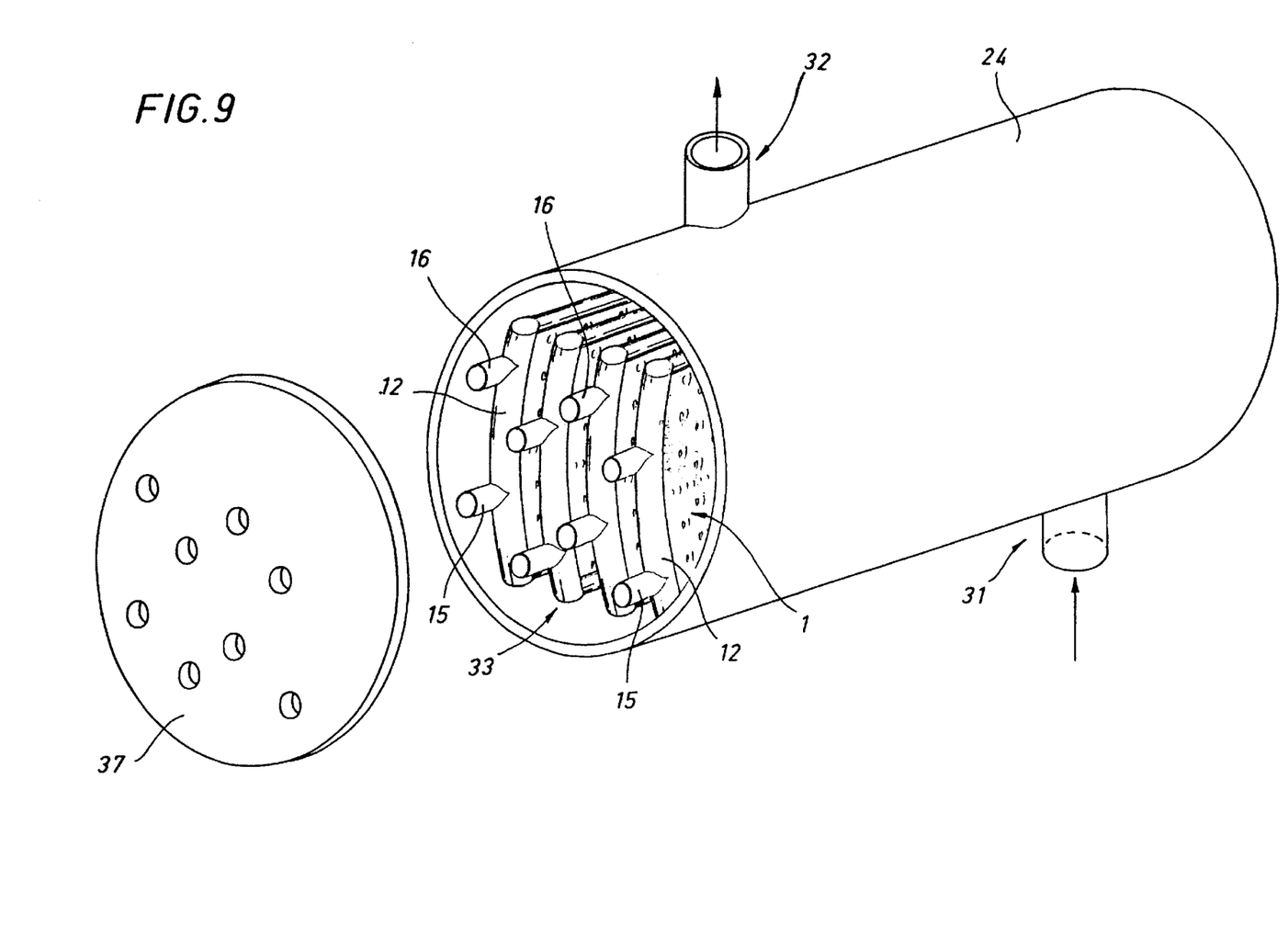
FIG. 9: a schematic perspective of a tubular body exchanger containing flat exchangers according to the invention and showing the extremities of the hydraulic connectors.

FIGS. 1, 2, and 3 show unitary exchangers, slightly incurved, of the type which are the subject of the invention.

These are metal exchangers, and have all the technical characteristics necessary for successful application of an enamel coating which will provide a durable seal, resistant to even potent chemicals.

First, unitary exchangers will be described, before proceeding to a description of how groupings of exchangers are used in specific applications.

Each exchanger has a generally flat metal body 1, with a slightly incurved or planar transverse section and with a lateral surface formed of two sheets of metal, a front sheet 2 and a rear sheet 3, spaced apart by cross pieces or interior indentations 4 stamped into the metal and defining a completely open interior space 5 or interior compartments or channels 6 between one or more interior divisions (FIGS. 19 through 24).

According to a preferred embodiment, the walls defining interior space 5 are joined at connection points or weld zones 7, for example, using an electrical or laser welding, or some other form of connection, as shown in FIGS. 19 through 24.

These embodiments endow the heat exchanger with excellent mechanical qualities. It is important to pay particular attention to the connecting points or areas 7 during preparation and enameling to ensure a continuous coating and reliable sealing.

Figure 25:
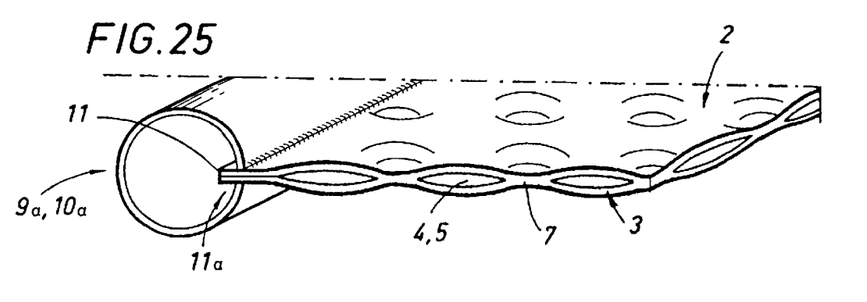
FIG. 25: a mixed cross-section with an extended perspective showing an example of flat unitary exchanger, similar to the embodiment of FIG. 19, whose edge piece is covered with a rounded reinforcing piece, which is, in this case, a slit tube member.

Longitudinal edge pieces 8 and 9 protrude somewhat or may be capped with rounded reinforcing elements 9a, for example, tubular sections 10 which either engage the edge pieces by locking onto them, as shown in the drawings, or which may even replace the edge pieces. Also, some other means may be used to achieve rounded, raised edges. In a preferred embodiment, shown in FIG. 25, a tube 10a is slit longitudinally and the tube is threaded onto the open edge piece 11 through the slit 11a and then connected to it.

Naturally, it is also possible to use semi-circular shapes slightly flattened on the sides, or any other similar shape.

Transverse edge pieces 12 and 13 are covered in the same way with a curved tubular piece or a flat piece with a rounded section, resulting in a raised shape that is easy to enamel, as it is larger and more rounded than the longitudinal edge pieces.

It is preferable for the transition between the rounded areas and the adjacent flat surface to be as gradual as possible, eliminating any narrow grooves or channels that would be difficult to coat.

The transverse edge pieces have near their median portion in the extension of the surface of the exchanger one or more tubular protrusions or stump-like portions 14 serving as an inlet and/or outlet, and inlet and/or outlet tubes or conduits for the liquid flowing through the exchanger are either integral with or connected to said protrusions. There may be either two distinct elements 15 and 16 located at each end of the exchanger or at a distance from each other on the same transverse extremity (FIGS. 1 and 3, respectively), or a single coaxial element 17 accepting two concentric conduits, an intake conduit 18 and an out take conduit 19 (FIG. 2). In both examples shown in FIGS. 2 and 3, the interior space is divided into two longitudinal compartments 20 and 21 by a longitudinal median interior partition 22 and open at the extremity. In the variations with a closed extremity there is a longitudinal median immobilizing bracket 23.

The shapes and surfaces created in this way have no thin, linear ridges extending beyond or below the surface. They have no protrusions or concave areas, nor any raised or small, slightly curved hollow areas with complicated shapes that would be difficult to coat.

This regular formation with rounded shapes and no pronounced raised areas provides the best surface for applying a uniform coating of enamel and ensures that the coating will remain durable over time.

Additional mechanical resistance or improved heat transmission can be obtained through the use of an enamel with a specialized composition.

The exchangers may be associated or assembled in different groups where they are arranged parallel to one another. They may also be grouped inside some type of container or tank.

One interesting application is shown in FIGS. 4 through 15, where the exchangers are arranged in parallel inside an enameled tubular container defined by a cylindrical tubular envelope 24 along which the exchange fluid flows, for example, a corrosive fluid which must be heated or cooled by circulating a heat-conveying fluid through the exchangers.

The unit formed by the parallel arrangement of exchangers 1 may be placed on transverse supports 25, in a Teflon cradle either supporting or forming a rack 26 with receptor slits 27 forming parallel housings, as shown in FIGS. 7 and 12 through 14. Preferably there are at least two racks, a lower rack 28 and an upper rack 29 designed to keep the unitary exchangers parallel to each other inside tubular container 24. This unit of two rack supports 28 and 29 may repeated some distance away.

Figure 12:
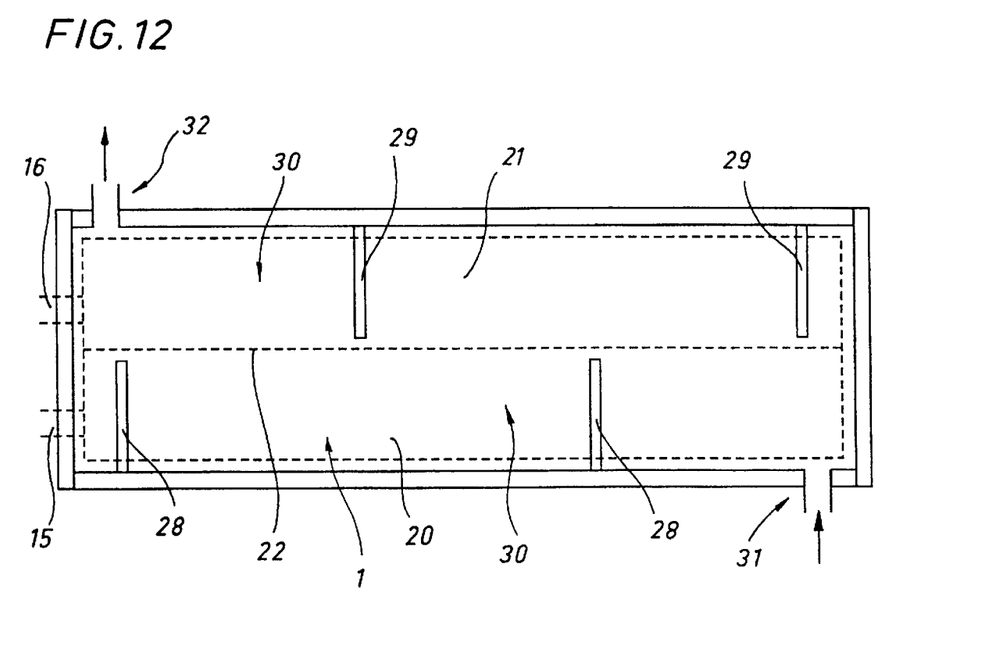
FIG. 12: a schematic cross-section of a tubular body exchanger with baffle plates enclosing a plurality of flat exchangers, of flattened cross section, supported by said baffle plates.
Figure 13:
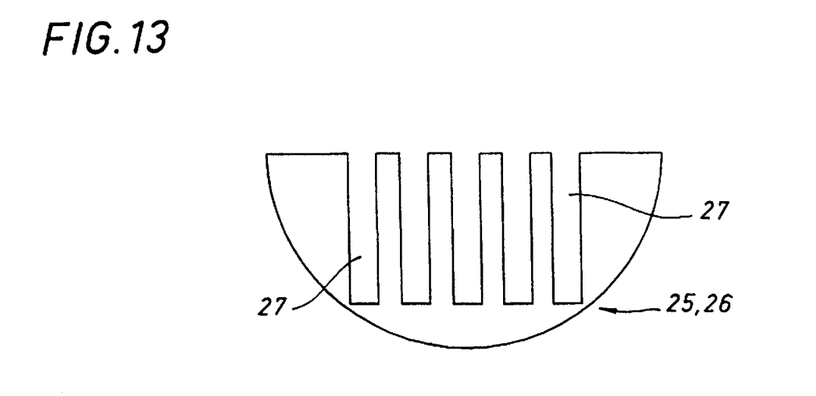
FIGS. 13 and 14: elevations of one example of a baffle plate without and with the exchangers, respectively.
Figure 14:
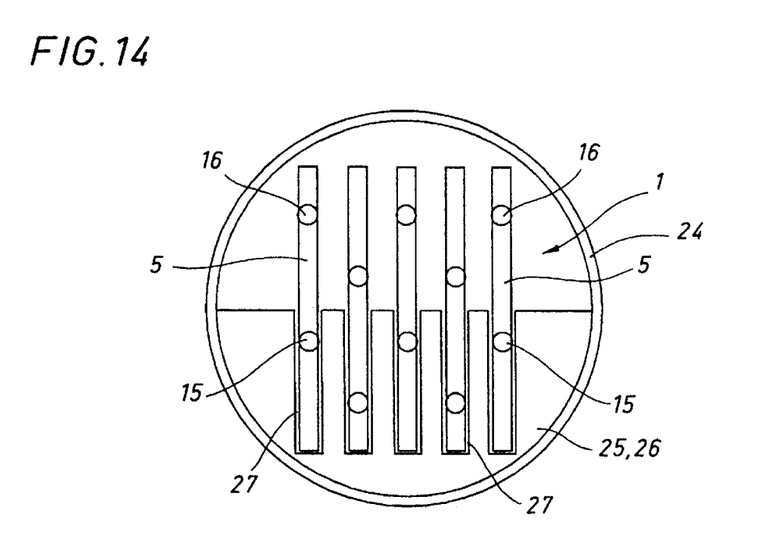

FIGS. 12 through 14 show an interesting variation.

There is an exchanger with a tubular body 24 surrounding baffle plates 30 formed of transverse support racks 28 and 29, which may be approximately the same height as the radius of tubular body 24. These transverse supports 28 and 29 are located in several places so as to constitute several baffle plates 30 running the entire length of the exchanger between the corrosive fluid inlet 31 and outlet 32 (FIG. 12).

It is advantageous for transverse supports 28 and 29 forming baffle elements 30 to fulfill a second function. As described above, they are equipped with parallel receptor slits 27 which support the exchangers inside tubular body 24 and maintain them in a parallel arrangement.

In this variation, the exchangers are intentionally flat, although it is possible for them to be slightly curved.

Figure 15:
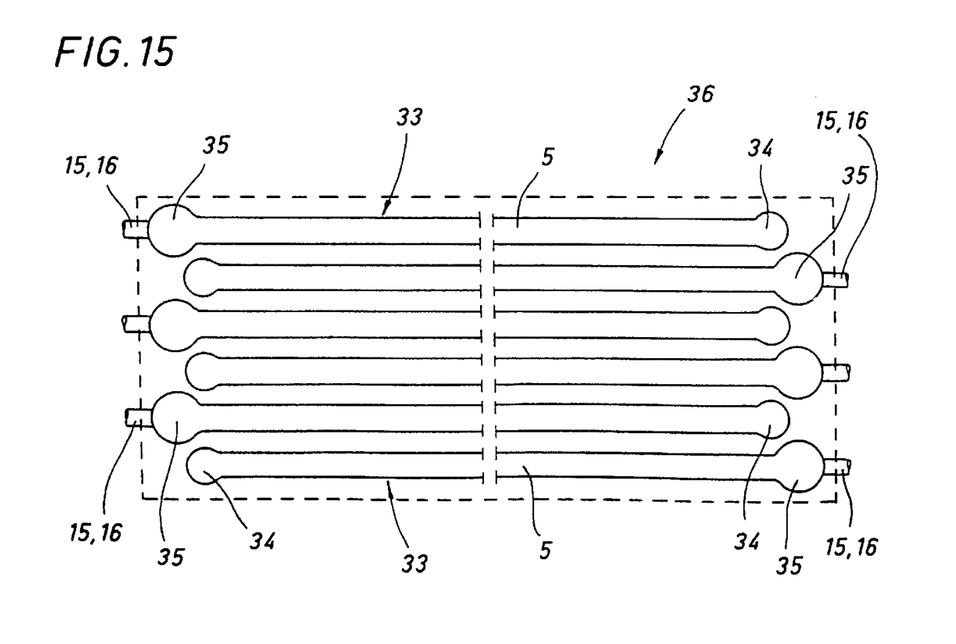
FIG. 15: a plan view of flat overlapping exchangers asymmetrically arranged, with the lateral extremities of each exchanger varying in section.

To improve the coefficient of volume of tubular body 24, which is proportionate to the performance of the exchanger, flat asymmetrical exchangers 33 are used, such as those shown in FIG. 15, for example. These exchangers have an inlet/outlet element on the same extremity. The body of these exchangers differs from the other embodiments in that the transverse edge pieces on the two extremities are not identical. Rounded transverse edge piece 34 on the closed extremity, that is, the sealed extremity, has a smaller diameter than that of rounded edge piece 35 on the opposite extremity comprising the inlet and/or outlet portions. This configuration allows compact groups 36 to be formed by staggering the position of two adjacent exchangers and thus tightly compacting two successive exchangers with minimal space between them. This will result in improved performance by tubular exchanger 24.

Figure 10:
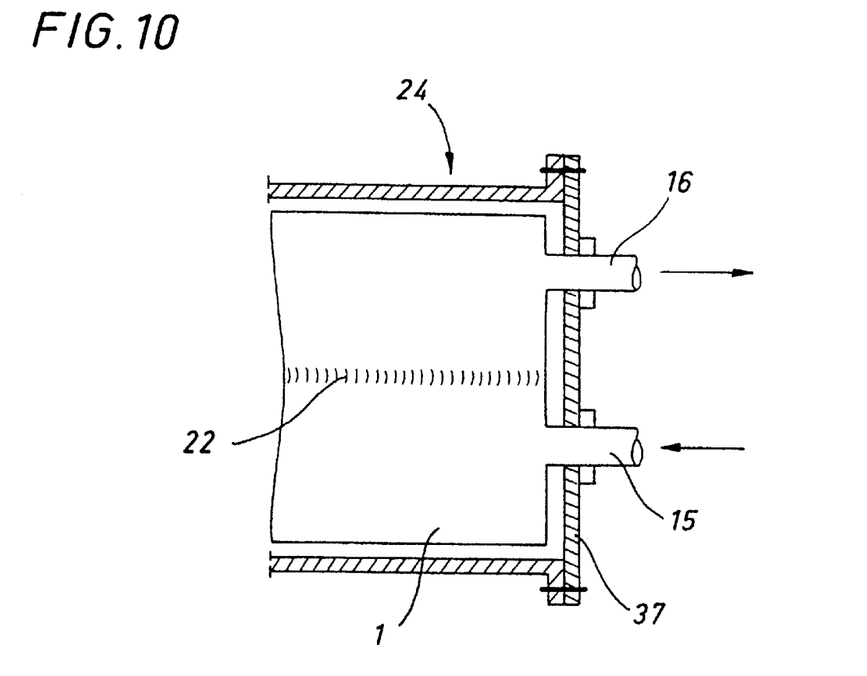
FIG. 10: a longitudinal cross-section of the extremity of the hydraulic connectors.
Figure 11:
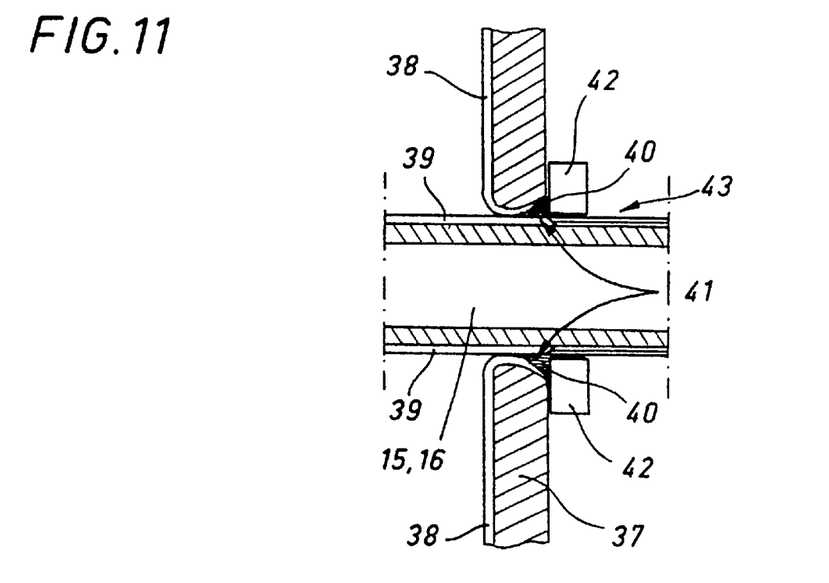
FIG. 11: an enlarged cross-section of a passageway through the sealing plate of the extremity of the hydraulic connectors.

One example of a passage through an end wall 37 of the tubular exchanger 24 is shown in FIGS. 10 and 11.

This passage may take place by direct contact between the interior enamel layer 38 of tubular body 24 with an exterior layer 39 protecting the inlet and outlet elements. A sealing material 40 is forced into a conical housing 41 using a pressure element such as a screw 42 attached to threaded extremity 43.

Another application concerns the use of at least one enameled exchanger inside the tank of a mixer or a reactor 44, particularly in a tank or a reservoir where a controlled chemical reaction takes place. The exchanger can absorb and then evacuate excess calories or even contribute the calories required to begin the reaction process, and then evacuate the excess calories when the reaction is produced.

Figure 16:
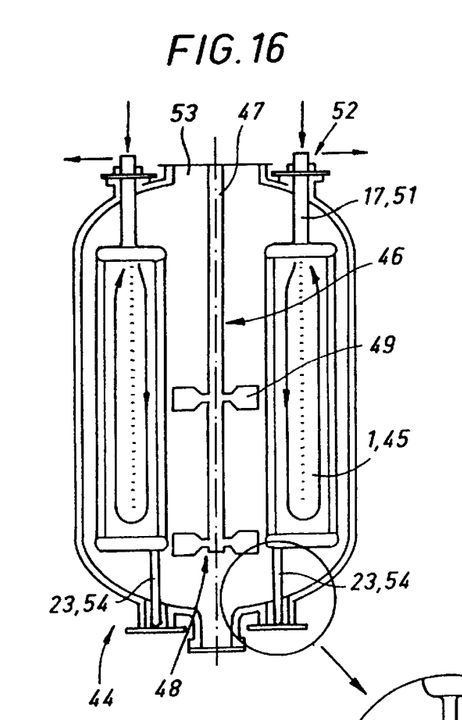
FIGS. 16 through 18: schematic vertical cross-sections with enlargements of the lower supporting extremity in the first two drawings, showing the use of unitary exchangers in a vertical cylindrical container, for example, when used in a chemical reactor.
Figure 17:
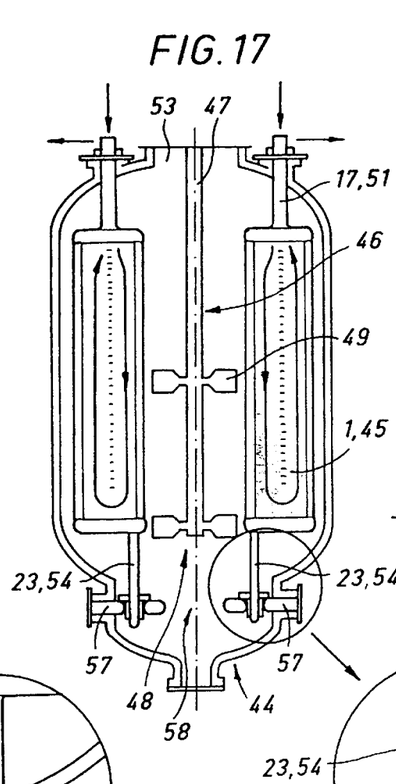
Figure 18:
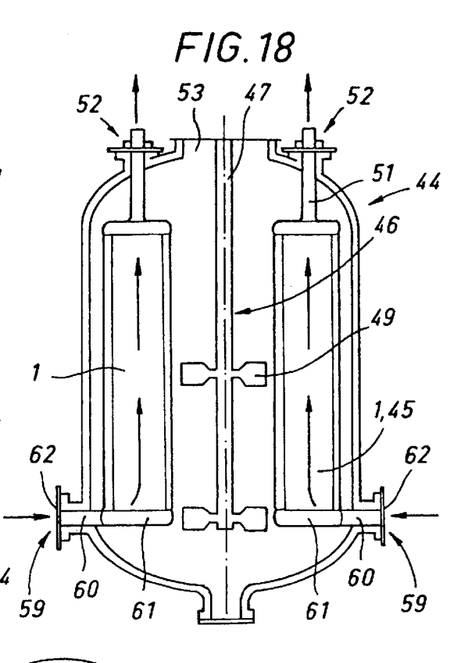
Figure 19:
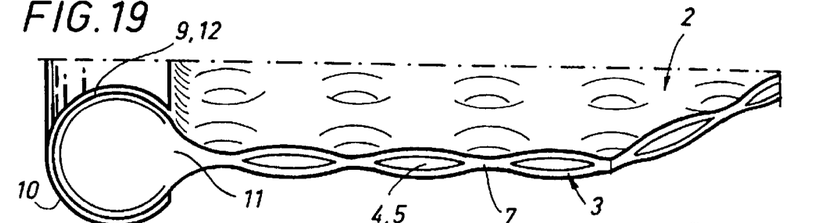
FIGS. 19 through 24: successive mixed cross-sections with an extended perspective of various forms of flat unitary exchangers that fall within the scope of the present invention.
Figure 20:
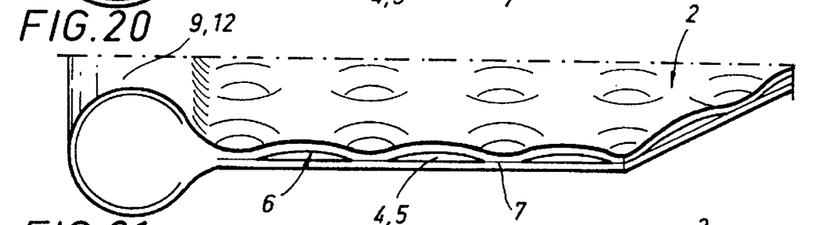
Figure 21:
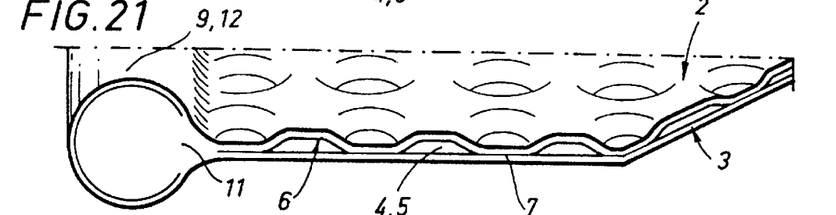
Figure 22:
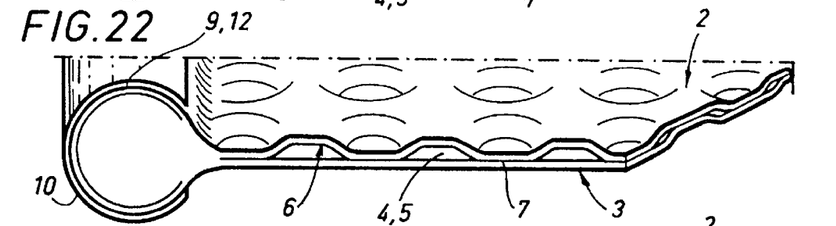
Figure 23:
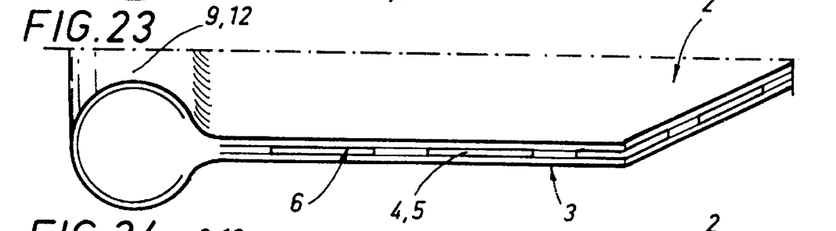
Figure 24:
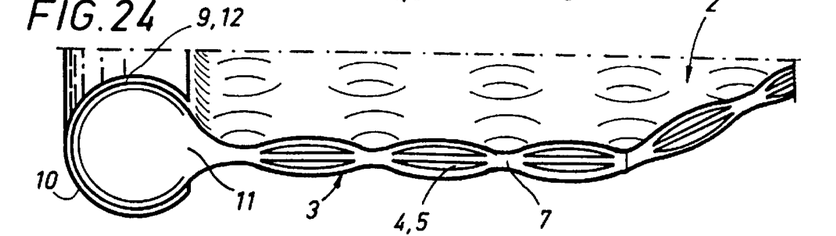

The preferred embodiment will consist of a plurality of incurved exchangers 45 arranged around a central agitator 46 whose central shaft 47 holds one or more rotors 48 equipped with blades 49, as shown in FIGS. 16 through 18. This complex exchanger 50 consists of a unit of elementary incurved exchangers such as those described above, in vertical arrangement, and radially disposed inside a cylindrical container. This unit is preferably static and when viewed from above, it resembles a turbine rotor, with exchangers 45 arching slightly to form the blades.

Exchangers 45 are mounted inside the tank forming the reservoir or chemical reactor using different techniques, as shown in FIGS. 16 through 18.

First, there are exchangers with an inlet/outlet in the form of a coaxial tubular portion 17 extending upward into an extension 51 passing through the tank of reactor 44 at the upper portion through passageways 52 in tubes arranged around the central upper opening 53 (FIGS. 16 and 17). The exchangers are mechanically immobilized at their lower extension 23 so their body remains parallel to the longitudinal axis of the tank and especially to permit expansion and compensate for the force of agitation. They may be attached by an immobilizing extension piece 54 whose extremity lodges in a receptor 55 made of chemically resistant synthetic plastic material (FIG. 16). Receptor 55 may consist of stopper 56, which may or may not be movable, and which receives the end of the immobilizing extension 54, as shown in detail in the drawings. According to the variation shown in FIG. 17, these stopper elements 56 are made of chemically resistant synthetic material recessed within the openings of a crown 57 transversely positioned in relation to the tank defining a central opening 58. Naturally, other embodiments are possible.

Yet another embodiment consists of providing on each exchanger a lower opening 59 through a transverse end conduit 60 which simultaneously forms the lower mechanically immobilizing support as shown in FIG. 18. Note in this drawing that the inlet consists of a reinforcing element 61 on the lower edge piece of the exchanger and that the exchanger opens onto a lower lateral flange 62 which serves as an interface with the coolant fluid circulation network in each exchanger.

The transverse shapes of the exchangers may vary, as shown in FIGS. 19 through 24. These drawings show an interior space 5 defined by two pieces of metal 2 and 3 which are connected at points by local solder-connection zones 7. Note also that transverse edge piece 12 and longitudinal edge piece 9 have a rounded, tubular shape that is easily coated with enamel.

What is claimed is:

1. A flat, one-piece enamel heat exchanger comprising:
two sheets of metal tightly sealed to each other at the borders of their longitudinal edge pieces and transverse edge pieces, defining an interior space, either open or compartmented, opening on the outside onto at least one transverse edge piece through at least one single or coaxial fluid communication, connected to an exterior fluid distribution network;
wherein the longitudinal edge pieces and the transverse edge pieces are covered with rounded reinforcing pieces, and the transverse profile of the exchanger is either flat or slightly curved, and an entire exterior surface of the body of the exchanger is continuously enameled with no interruption in the enameled coating extending to the connections with the exterior fluid distribution network.

2. The exchanger according to claim 1, wherein the longitudinal edge pieces and the transverse edge pieces are covered with an open tube member attached to each of them through a longitudinal slit and threaded along the edge piece through said slit.

3. An exchanger according to claim 1, wherein the sheets of metal are connected to each other at certain points or zones before the enamel coating.

4. An exchanger according to claim 1, wherein the sheets of metal are separated by an interior partition parallel to the longitudinal edges of the exchanger which separates the interior space into two juxtaposed compartments.

5. The exchanger according to claim 1, wherein the interior space is partitioned by walls perpendicular to the surfaces so as to form interior compartments.

6. The exchanger according to claim 1, wherein the interior space is divided into two independent, side-by-side longitudinal compartments by a median longitudinal partition.

7. The exchanger according to claim 1, wherein each transverse edge piece has a tubular outlet portion.

8. The exchanger according to claim 1, wherein a single transverse edge piece is equipped with a transverse inlet/outlet element.

9. The exchanger according to claim 1, wherein the inlet/outlet elements are distinct.

10. The exchanger according to claim 1, wherein the inlet/outlet unit is a coaxial element.

11. A plurality of flat, one-piece enamel heat exchangers, each heat exchanger comprising:

two sheets of metal tightly sealed to each other at the borders of their longitudinal edge pieces and transverse edge pieces defining an interior space, either open or compartmented, opening on the outside onto at least one transverse edge piece through at least one single or coaxial fluid communication, connected to an exterior fluid distribution network;

the longitudinal edge pieces and the transverse edge pieces are covered with rounded reinforcing pieces, and the transverse profile of the exchanger is either flat or slightly curved, and an entire exterior surface of the body of the exchanger is continuously enameled with no interruption in the enameled coating extending to the connections with the exterior fluid distribution network;

wherein the plurality of heat exchangers are disposed in parallel to one another, one beside the other, and maintained in place and separated form one another by transverse supports, and disposed inside a tubular envelope with a completely enameled inside area, forming a compact heat exchanger.

12. The plurality of heat exchangers as set forth in claim 11, wherein the transverse maintenance supports are transverse rack-like supports comprising a plurality of parallel receptor slits, each serving as a housing for a portion of the body of each exchanger.

13. The plurality of heat exchangers as set forth in claim 12, wherein the transverse rack-like supports act like baffle plates.

14. The plurality of heat exchangers as set forth in claim 12, wherein the exchangers are asymmetrical with transverse edge pieces that are unalike, juxtaposed in a staggered arrangement to form a compact exchanger.

15. The plurality of heat exchangers as set forth in claim 14, wherein the rounded edge of one of the transverse edge pieces has a larger diameter than the other one.

16. A plurality of flat, one-piece enamel heat exchangers, each heat exchanger comprising two sheets of metal tightly sealed to each other along a border delineated by longitudinal edge pieces and transverse edge pieces, the two sheets of metal defining one of an open and compartmented interior space having an opening to at least one transverse edge piece through at least one of a single and coaxial fluid connection communicating with an exterior fluid distribution network;

the longitudinal edge pieces and the transverse edge pieces are covered with rounded reinforcing pieces, and a transverse profile of the heat exchanger is either flat or slightly curved, and an entire exterior surface of the body of the heat exchanger is continuously enameled with no interruption in an enameled coating extending to the connections with the exterior fluid distribution network; and wherein the plurality of heat exchangers are arranged upright and substantially radially around a shaft of a central agitator of a tank of a chemical reactor.

17. The plurality of heat exchangers as set forth in claim 16, wherein each heat exchanger has a lower extension which engages in a receptor.

18. The plurality of heat exchangers as set forth in claim 17, wherein each receptor is provided in the base wall of the tank.

19. The plurality of heat exchangers as set forth in claim 17, wherein each receptor is provided in a transverse crown mounted near the base of the tank.

* * * * *